United States Patent
McMillan (10) Patent No.: US 7,744,093 B2
(45) Date of Patent: Jun. 29, 2010

(54) SEALS AND A METHOD OF MAKING SEALS

(75) Inventor: Alison J McMillan, Uttoxeter (GB)

(73) Assignee: Rolls-Royce plc, London (GB)

( * ) Notice: Subject to any disclaimer, the term of this patent is extended or adjusted under 35 U.S.C. 154(b) by 309 days.

(21) Appl. No.: 11/519,817

(22) Filed: Sep. 13, 2006

(65) Prior Publication Data
US 2007/0126187 A1 Jun. 7, 2007

Related U.S. Application Data

(63) Continuation-in-part of application No. 10/630,836, filed on Jul. 31, 2003, now abandoned.

(30) Foreign Application Priority Data

Aug. 23, 2002 (GB) ................................ 0219781.2

(51) Int. Cl.
*F16J 15/44* (2006.01)
*F16J 15/447* (2006.01)
(52) U.S. Cl. ...................... 277/355; 277/412
(58) Field of Classification Search ......... 277/411–414, 277/417, 421, 355
See application file for complete search history.

(56) References Cited

U.S. PATENT DOCUMENTS

| 2,871,038 | A | * | 1/1959 | Comery | 277/421 |
| 5,568,931 | A | * | 10/1996 | Tseng et al. | 277/355 |
| 5,833,369 | A | * | 11/1998 | Heshmat | 384/105 |
| 6,644,667 | B2 | * | 11/2003 | Grondahl | 277/355 |
| 6,860,484 | B2 | * | 3/2005 | Urlichs | 277/412 |

* cited by examiner

*Primary Examiner*—Vishal Patel
(74) *Attorney, Agent, or Firm*—Jeffrey S. Melcher; Manelli Denison & Selter PLLC (57) ABSTRACT

A seal and method of making seals utilizes folds in order to form creases in a length of material such that the creases reinforce individual seal elements or surfaces while perforations or slots in a seal edge allow air leakage from one side of the seal element or surface to the other. Thus, air pressurization can take place between spaced seal elements or surfaces and this allows air flotation or riding of a rotating component relative to a static housing component. The perforations are typically graduated from the seal edge in order to provide the best pressurization and air-riding effect for proximity or gap control between the sealing edge and the rotating component surface. The slots effectively provide flexibility to the sealing edge such that the seal component emulates a brush seal.

41 Claims, 5 Drawing Sheets

SEALS AND A METHOD OF MAKING SEALS

CROSS REFERENCE TO RELATED APPLICATION

This application is a continuation in part of application Ser. No. 10/630,836 filed Jul. 31, 2003 and now abandoned, which claims priority to GB 0219781.2, filed Aug. 23, 2002.

FIELD OF THE INVENTION

The present invention relates to seals and more particularly to seals used between a static part and a rotating part such as a shaft in an engine.

Seals, and in particular air seals, are required within gas turbine engines between static and rotating components. Typically, the seals prevent leakage of cooling air from regions of high pressure to regions of low pressure. Clearly, the seals must be able to withstand and cope with the differential pressure across the seal from the region of high pressure on one side to the region of low pressure on the other. Furthermore, there may be significant accommodation and packaging problems within an engine in terms of the space available to accommodate the seal but nevertheless good sealing is required during rotating component excursions and misalignments during operations.

Previously labyrinth and brush seals have been used. An example of a labyrinth seal is given in United Kingdom Patent No. 803452. The labyrinth seal described in GB803452 presents a spiral incorporating folds such that the seal can be screwed into a housing and a rotating shaft held in the coil core of the spiral. The folds provide a degree of reinforcement but nevertheless the shaft can engage in a number of excursions and mis-alignments which diminish the acceptability of the seal provided. A brush seal essentially comprises bristles which extend towards the relative rotating component and provide the desired seal but are subject to wear and non-ideal sealing/support for the rotating component in operation.

SUMMARY OF THE INVENTION

In accordance with the present invention there is provided a seal comprising an edge to be held in close proximity in use to a relatively rotating surface, the edge being reinforced by creases extending away from the edge, the seal characterised in that a desired distribution of perforations is provided above the edge to facilitate air pressure differential adjustment across the edge as the rotating surface rotates in relation to the edge and the rotating surface rides upon an enhanced back pressure created by air leakage through the perforations.

Alternatively, in accordance with the present invention, there is provided a seal comprising an edge to be held in close proximity to a rotating surface in use, the edge being reinforced by creases extending away from the edge, the seal characterised in that between the creases the edge includes slots to facilitate flexibility in the edge when held in close proximity to the rotating surface.

Preferably, the seal includes both perforations and slots.

Normally, a plurality of edges is provided in a seal assembly, and these edges are presented upon respective spaced seal elements or surfaces of the seal assembly.

Preferably, the perforations are graded outwardly from the edge. Typically, the perforations nearer to the edge will be relatively small compared to perforations further displaced from the edge. Generally, the perforations are configured from one side to the other to facilitate airflow to achieve the desired air pressure differential across the edge.

Preferably the creases are angular to form a ring with sails between creases. Where the seal incorporates more than one edge, creases in adjacent spaced seal elements or surfaces incorporating those respective edges will be in a respectively opposed relationship.

Preferably, the slots extend substantially perpendicular to the major axis of the edge. Typically, the slots terminate in a keyhole or bulbous end to inhibit crack propagation caused by flexing. Advantageously, the slots are of varying length extending away from the edge. Normally, the slots will have a length at least equivalent to the wear depth in use of a seal.

Typically, the edge will be substantially straight between respective creases. Alternatively, the edge may be curved between respective creases.

Possibly, a stiffener element may be secured to the seal to further reinforce each edge. Possibly, an air deflector may be associated with the edge in order to further facilitate air pressure differential across the edge. Possibly, the edge may be formed upon a spiral which extends for a number of cycles to form the seal.

Also in accordance with the present invention is provided a method of forming a seal element including the steps of taking a length of material and forming a number of creases to define a seal edge and characterised in that there are perforations formed in that length of material such that when formed there is a specific distribution of perforations above the seal edge for air leakage in use.

Alternatively, in accordance with the present invention there is provided a method of forming a seal element including the steps of taking a length of material and forming a number of creases to define a seal edge and characterised in that slots are formed in the length of material which when the seal is formed extend from the seal edge to render that edge more flexible.

Preferably, the method includes both forming perforations and forming slots in the length of material in order to define the seal.

Advantageously, the ends of the length of material are welded or otherwise secured together in order to form a ring.

Normally, the perforations are formed such that there is a size graduation away from the seal edge. Typically, the perforations nearer to the edge will be smaller than those at more displaced positions.

Possibly, the perforations may be distributed at varying numerical densities as well as sizes at positions relative to the edge.

Typically, a number of seal elements are secured in alignment to form a seal assembly. Possibly, spacer elements are located between adjacent seal elements. Normally, each seal element is secured in a recess or aperture to form the seal assembly.

BRIEF DESCRIPTION OF THE DRAWINGS

Embodiments of the present invention will now be described by way of example only with reference to the accompanying drawings in which.

DETAILED DESCRIPTION OF THE INVENTION

Figure 1:
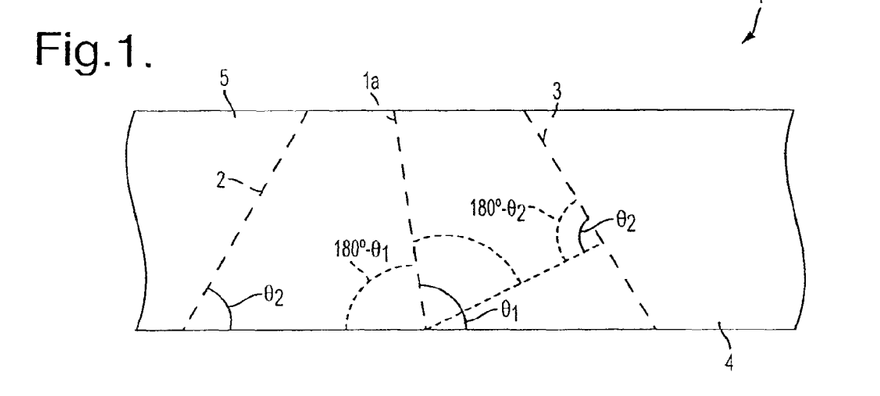
FIG. 1 illustrates a length of material indicating positions of creases in accordance with the present invention.

FIG. 1 illustrates a section of material 1 such as steel or a nickel alloy from which a seal in accordance with the present invention is formed. The length of material 1 is folded to create a set of forward folds 2 and a set of backward folds 1a, and 3 such that the creases formed about these folds 1a, 2, 3 create a ring or disc for location about or on a rotating shaft in use. It will be appreciated that the choice of angles $\Theta_1$. $\Theta_2$ for the folds 1a, 2, 3 and therefore the creases in the length of material 1 essentially determine the curvature of the ring formed.

Furthermore, the number of creases formed by folds 1a, 2, 3 will create greater iterative curvature in the material 1 and so closer proximity for an inner or sealing edge 4 to a desired curvature for consistency with that of a rotating component. In short, in side view the material 1 appears to be kinked about the folds 1a, 2, 3 into the desired ring formation to form a seal in accordance with the present invention. As depicted, the seal edge 4 is on the inner circumference but it will be appreciated when the seal is mounted on the rotating component that the outer edge could be the sealing edge. As shown in FIG. 1, folding about lines 1a and 2 causes a net rotation α where crease line 2 will lie on top of line 3 and the angles $\Theta_1$. $\Theta_2$ define the crease lines 1a and 2 relative to the inner edge 4. The creases extend across the width of the section 1 to the outer edge 5. By way of example, $\Theta_1$ could be in the range of 110° to 120° while $\Theta_2$ could be in the range of 60° to 70°. By crease is meant a folding of a section of the material 1 to contact and at least partially overlie an adjacent section as will be apparent from FIG. 1 when the section on the left hand side of line 1 is folded so that line 2 will overlie line 3. The section to the left of line 2 is then folded so that the strip will commence to assume the ring shape. With the crease angles properly selected, the left end of the strip material 1 will be brought into contact with the right end whereupon these ends are secured together as by welding. It will be seen that the resultant ring shape is achieved by using pairs of angles that are not equal and about which adjacent sections of the strip are moved to form the crease line extending from one edge to the opposite edge.

The inner edge 4 as described previously will provide a sealing edge in use while an outer edge 5 is appropriately secured within a housing to locate the seal. This location will generally take the form of a recess or a groove in the housing from which the material 1 and therefore the seal extends inwardly to present the edge 4 as required. The area between folds 1a, 2, 3 and therefore creases in the material 1 can be defined as sails which are reinforced by the folds 2, 3 in order to appropriately resiliently present the seal in use. Appropriate reinforcement is required as the seal elements will be made from sections or lengths of foil material 1. Such foil is thin for compliance as a seal but will not resist the air pressure differences placed across it and so will distort.

The present invention essentially provides an air seal between static and rotating parts. It will be understood that in certain areas of an engine it is difficult to control the gap between such static and rotating parts but nevertheless a relatively high level of sealing will be required. An example of such a sealing requirement is for the highly compressed air from the compressor last stage to the first stage of a turbine for the purposes of blade cooling in a jet engine. Ideally, the seals should be relatively stiff to resist differential air pressure across the seal whilst complying particularly about the sealing edge to accommodate rotor shaft mis-alignment. It will be understood that components, and in particular rotating components, can become displaced through thermal gradients, wear, lack of balance symmetry or excursion. A good seal should be able to accommodate for such mis-alignment. In the present invention air is used to provide a lifting force which will tend to push the seal away from the rotating part whilst the folds 2, 3 form creases in the seal which will act to reinforce and stiffen that seal to oppose air pressure differentials distorting the seal in use. In accordance with the present invention leaking air is used to provide a lifting force which will tend to locate the seal edge 4 away from the rotor shaft whilst the stiffness of the seal will act to oppose this. In such circumstances, there will be a predictable and well controlled gap between the rotating part and the seal edge 4 which can be minimised for normal operating conditions but rendered acceptable at extremes and provide a fail safe in other circumstances. The actual distribution of the folds 2, 3 in order to provide reinforcing creases is chosen in accordance with desired compliance and stiffness relative to the performance.

Figure 2:
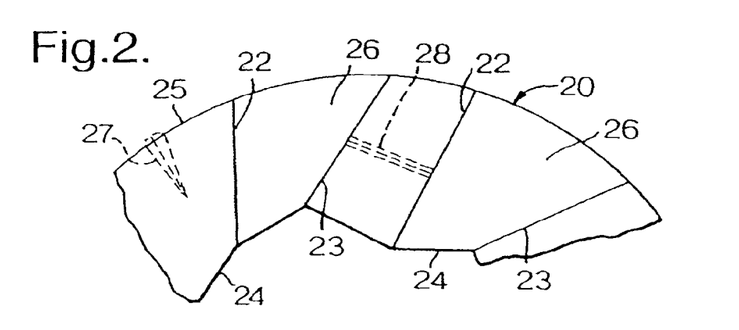
FIG. 2 is a plan view of a portion of a seal formed as a ring.

FIG. 2 illustrates a section of a seal 20 in accordance with the present invention. Folds 22, 23 are provided to give the seal 20 reinforcing creases such that a sealing edge 24 is appropriately resiliently presented in use to a rotating part. An outer edge 25 as described previously will be secured appropriately to present the seal 20 in use. This presentation may be perpendicular or at an angle to the rotating part in a cone configuration. As described previously, in side or plan view the seal 20 will appear staggered with sails 26 between the folds 22, 23 being angularly presented to the edge 24 such that the concertina effect allows the edge 24 to approximate its rotating part in use and therefore has a smaller diameter than the outer edge 25 appropriately secured. Nevertheless, it will be appreciated that the edges 24, 25 are not substantially flat but have a saw tooth or kinked planar configuration. It will be appreciated, the greater number of sails 26 the more iterative is the turning or curvature of the seal 20 and so a closer approximation of the edge 24,25 to a flat planar component.

The folds 22, 23 provide creases in the seal 20 for reinforcement. It will be appreciated, that as depicted with dotted lines 27 partial or wedge fold creases can be provided in the seal 20 which do not extend from the edge 25 to the edge 24 or vice versa in order to provide further reinforcement control if required. Furthermore, where possible, circumferential reinforcement ribs or folds shown as dotted lines 28 could be provided for reinforcement. These circumferential reinforcement ribs or folds 28 could extend in individual sails 26 or for the complete circumference of the seal 20. As an alternative to wedges 27 or ribs 28 folded as creases in the seal 20 these elements could take the form of separate reinforcement wedge and rib components appropriately secured to the seal 20.

Figure 3:
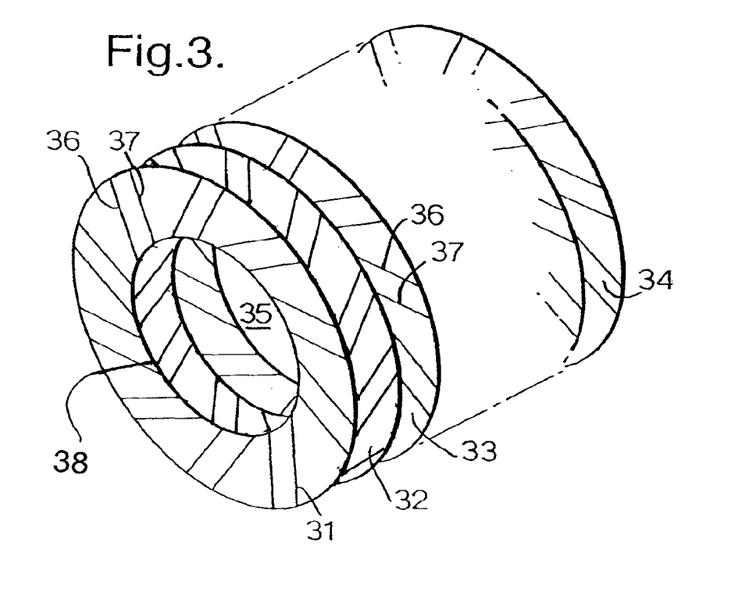
FIG. 3 is a schematic illustration of several spaced seal element surfaces to form a seal assembly.

A practical seal in accordance with the present invention will generally comprise a number of spaced seal surfaces or elements in a seal assembly. Thus, FIG. 3 illustrates in a schematic perspective spaced seal surfaces 31,32,33,34 shown in substantial alignment such that a core 35 extends through the seal surfaces 31,32,33,34 within which a rotating component will be located in use. The spaced sealing surfaces 31,32,33 include respective folds 36,37 as described previously in order to create a ring seal surface 31,32,33,34 from a length of appropriate material with creases to create kinks in the surfaces 31,32,33,34. These folds 36, 37 as described previously create creases in the surfaces 31,32,33,34 for reinforcement. As can be seen in FIG. 3 the folds 36,37 in adjacent surfaces 31,32,33,34 are arranged to be angularly opposed that is to say the folds 36,37 in one surface 31 have a substantially clockwise radiating angular presentation from the seal edge 38 compared to its adjacent seal surface 32 which has an anti-clockwise a clockwise radial angular fold 36, 37 presentation. It will be understood that radial angular presentation of the folds facilitates creation of the ring seal surfaces 31,32, 33,34. Such opposed reinforcement folds 36, 37 in adjacent seal surfaces will provide a more robust seal assembly in use. It will be appreciated that the radial angles for the folds 36, 37 in respective adjacent seal surfaces 31,32,33,34 may also be different in order to provide different levels of reinforcement and therefore compliance at different positions in the seal assembly formed from the surfaces 31,32,33,34 if required. Adjacent surfaces 31,32,33,34 effectively define a space within which air leakage accumulates to provide a back pressure upon which the rotating part or seal rides with the desired gap between them.

Figure 8:
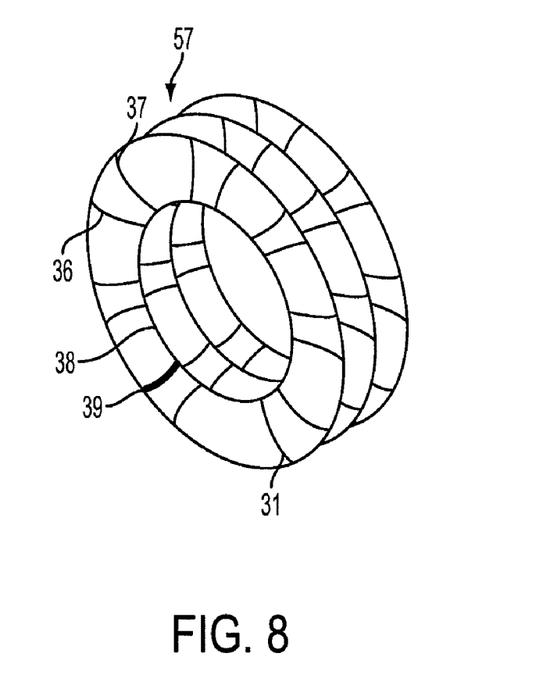
FIG. 8 is a view of a spiral seal element.

As indicated previously, typically each seal 20 or seal surface 31,32,33,34 will take the form of a ring created from a length or strip of material. Once formed into a ring, the respective ends of that length of material 1 will be secured together by a weld or other appropriate means. Alternatively, as shown in FIG. 8 a seal may be formed from an extended length of material such that a spiral is created with spaced locations 57 between respective coils of that spiral such that an air seal pressure space can be created between the respective coil seal surfaces. It will also be appreciated that with a spiral construction the ends 39 of the spiral could also be welded to or otherwise secured to a portion of the spiral in order to create a substantially flat end if required.

As indicated previously, in accordance with the present invention air leakage is provided through the seal or seal surfaces in order to create appropriate presentation of the seal for operation. The length of material is folded or pleated in order to form the ring. The choice and position of the angle of crease lines is determinant of directional stiffness of the seal and so in turn determinant as to the designed air pressure drop across the seal and the air riding behaviour created by air forced through the gap between the bottom sealing edge and the rotating component. Clearly, if air pressure is to be utilised there must be air leakage through the seal in order to create a back pressure. If the seal were a solid component high pressure would simply pass initially through the gap until through a cascade regulation of gaps in a labyrinthine effect a back pressure was created in order to achieve a seal.

Figure 4:
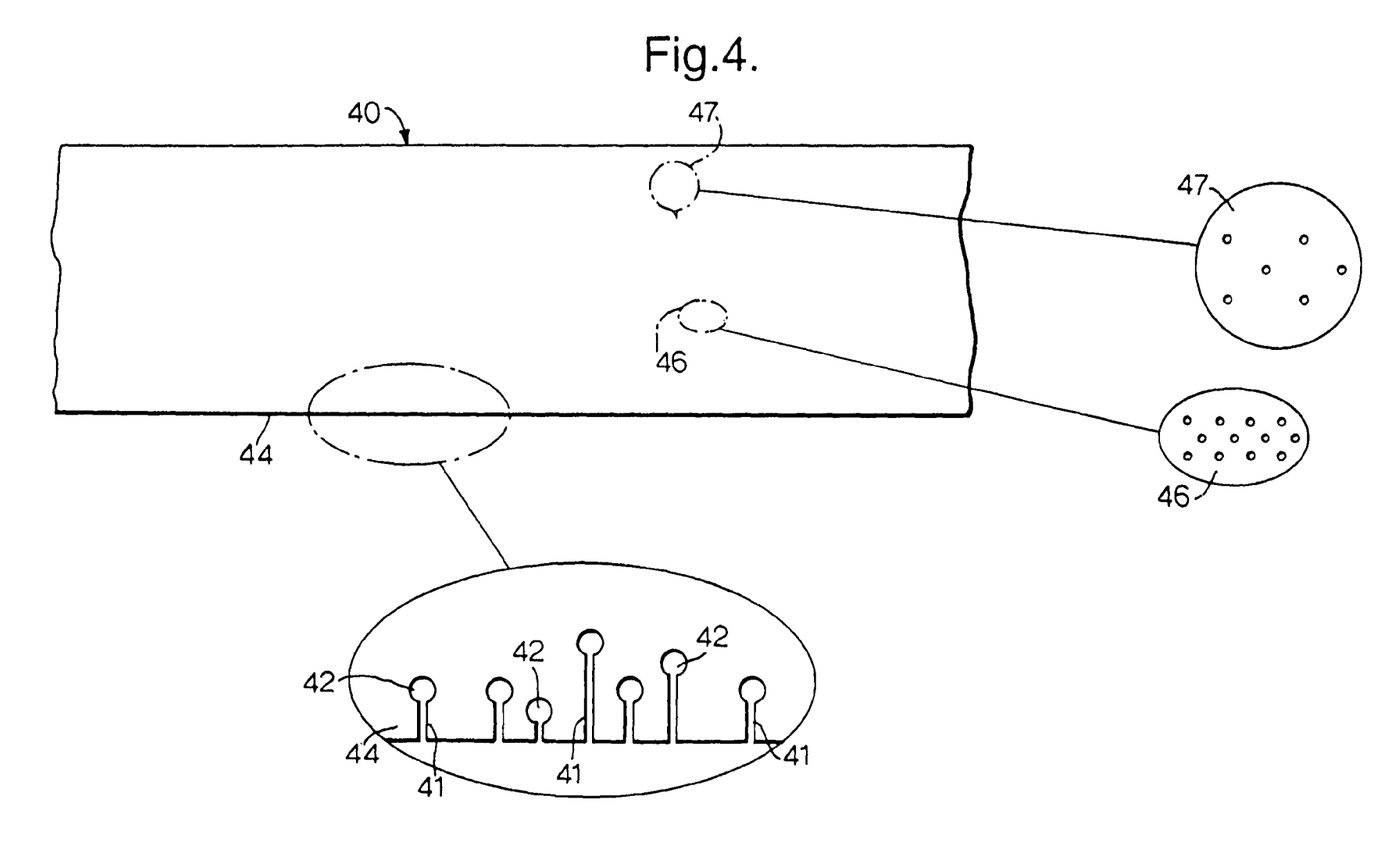
FIG. 4 is a schematic illustration of a section of a seal element and including enlarged illustrations of a seal edge, a first perforation position and a second perforation position relative to that seal edge.

FIG. 4 schematically illustrates a section of seal 40 with a seal edge 44 extending between fold creases (not shown). A section of the seal edge 44 is shown in enlarged format for greater clarity. Similarly, portions 46, 47 of the section of seal 40 are also depicted in enlarged format for clarity.

The portions 46, 47 respectively show that the seal 40 incorporates a large number of perforations. These perforations render the seal 40 permeable to airflow and instigate an air-riding effect such that the edge 44 is lifted above a rotating component in use with a desired gap therebetween but the respective pressure either side of the seal 40 ensuring containment and therefore sealing of coolant air either side of the seal 40 as required. Although there are a large number of perforations in the seal 40 the fold creases (not shown) reinforce the seal 40 to provide a robust presentation. Generally, it is desirable that the edge 44 is relatively compliant and flexible in order to replicate the performance of a brush seal where bristles of that brush seal effectively provide a curtain to divide the high and low pressure sides of the seal.

Generally, the perforations in zone 46 nearer to the edge 44 are in a closer spaced relationship but of a smaller diameter compared to perforations in zone 47 at a more displaced position relative to the edge 44 where the perforations are more widely spaced but of greater diameter. Such an arrangement ensures that air leakage is utilised to its best effect near to the edge 44 in order to provide an appropriate seal. The actual format of the perforations can be round as depicted or shaped (oval, cross, triangular) as required. Furthermore, there may be a degree of jet constrictions from one side of the perforation to the other if required.

The edge 44 preferably includes slots 41 which extend typically perpendicularly from the edge 44. The slots 41 essentially provide a degree of edge flexibility to the seal for better presentation in proximity to the relatively rotating component. The slots 41 generally terminate in stopping holes 42 which prevent crack propagation as the segments between the slots 41 flex in use. It will be appreciated that the slots 41 and the holes 42 themselves provide a degree of air leakage from one side of the seal 40 to the other.

Ideally, the seal 40 will incorporate perforations as well as slots whereby the air leakage facilitates sealing whilst the slots facilitate edge flexibility for proximity compliance with the rotating component and benefits in situations of rub interaction. The perforations allow air to pass through respective seal surfaces in order to pressurise a space between adjacent surfaces. This pressurisation creates an air-riding effect upon a rotating component relative to the brush seal. However, the present invention in comparison with a brush seal has the advantage that by appropriate location of particular perforations it is possible to specifically control and adjust between adjacent surfaces as required for particular circumstances. The size of the perforations and/or slots will be dependant upon particular installations but will generally be in the order of 1 or 2 millimeters for the perforations and several millimeters for the slots. Furthermore, the minimum slot depth will generally be at least that expected through operational wear of the seal in use.

Normally, the seal edge will be flat as described previously but through appropriate machining or in-service commissioning may be slightly curved for closer proximity to the rotating component. Furthermore, the seal edge may be coated with an appropriate seal or lubricating coating as required.

As indicated previously, it is creation of inter-seal element pressure which provides the air-riding effect desired in accordance with the present invention. Thus, typically at least two seal surfaces in accordance with the present invention with seal edges will be used but nevertheless a single seal surface with perforations and/or edge slots in accordance with the present invention may be used in association with a plain foil or brush seal in order to provide the desired inter-space pressurisation for air-riding in accordance with desired rotating part operation. The present seal assembly comprises a succession of seal surfaces axially disposed and normally in alignment around a rotating component. The sealing surfaces are located in a static housing. Each surface as described previously comprises a folded length or foil of material with creases acting to reinforce that foil in order to create a robust physical barrier between the rotating component and the static housing. In use, the desired curvature for the seal is determined and a length of appropriate foil is folded in order to create each individual seal surface element as a ring to extend around the rotating component. Generally, these folds are provided by a press tool acting as required at angular positions relative to the length of material in order to create kinks and so curvature to the desired ring format. The ends of the ring are then secured together in an appropriate manner. It will be appreciated the actual fold or crease angles $\Theta_1$, $\Theta_2$ are determined by the desired curvature necessary to extend around the rotating component with a desired close proximity and therefore gap between a sealing edge and the surface of that rotating component. As the folds, in addition to providing the curvature desired, also provide axial reinforcement to stiffen the seal, care should also be taken with regard to the fold angles $\Theta_1$, $\Theta_2$ used. Normally, as depicted in the drawings, the folds are straight, however where necessary it is possible the folds could take the form of bowed or arrowhead paths across the width of the length of material in order to create the desired curvature and reinforcement. It will be understood, that the folds although providing axial reinforcement allow the seal to have a degree of radial compliance to accommodate excursions and misalignment of the rotating component.

Typically, whilst the length of material is still in a strip foil form a number of perforations and/or slots are pressed or cut in that strip of foil material. One edge of the strip of material is defined as the sealing edge and the slots cut in that edge. Furthermore, the perforations are graduated such that there is a greater concentration of perforations nearer to the sealing edge. Thus, in use air leaking through the perforations provides a pressure which acts to lift the seal component radially away from the rotating component to a controlled minimised clearance gap between the sealing edge between creases and the rotating component. As each seal edge segment between creases is substantially straight it will be understood the gap directly below the creases will be greater than at intermediate edge positions.

A number of techniques are known for providing a large number and distribution of small perforations in a foil. These techniques include erosion, piercing and other procedures. Essentially the small perforations allow air to pass through the seal in order to pressurise the space between one seal element and its adjacent seal element to create the air-riding effect for positioning of the rotating component relative to the sealing edges of the seal. The number and distribution of perforations will depend upon operational requirements. The use of lasers for the creation of the perforations 46, 47 and the slots 41 and stopping holes 42 would be convenient. The laser bending technique could be used to generate the folds 22 and 23, and laser cutting to give precise seal edge geometry 24, 25.

Installation of a practical seal will involve creation of a number of seal elements as described previously. These elements will be located in a rotating component housing. Thus, individual seal elements may be secured at spaced locations in apertures in the housing. These seal elements may be installed in a similar fashion to a circlip such that the element is constricted with an appropriate tool to a narrower dimension, located above the recess or groove and then released into that groove for appropriate location. Alternatively, and normally preferably, respective seal elements or surfaces will be loaded into a housing having a core cavity of substantially the same diameter as the outer edge of each seal element and spacer elements located between respective adjacent seal elements in order to provide a seal assembly in accordance with the present invention. It will be appreciated that typically the spacing between individual seal elements or surfaces will be substantially the same axially through the seal assembly, however where required different spacings may be provided in order to achieve the desired leakage air pressure for the air-riding effect between the rotating component and the seal edge.

Figure 5:
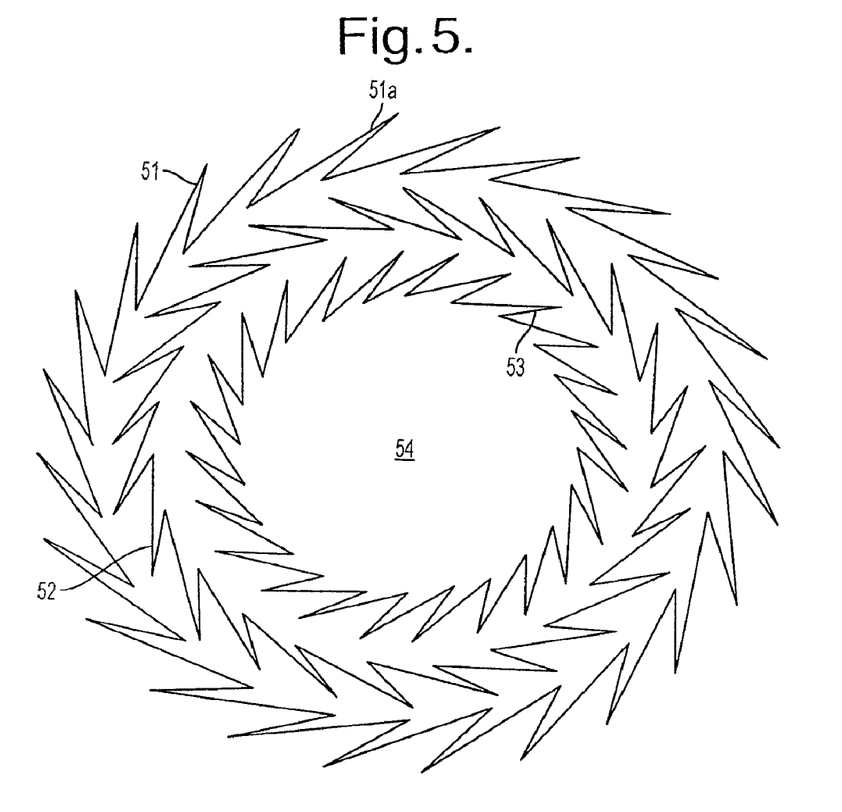
FIG. 5 is a part schematic depiction of an alternative seal configuration in accordance with the present invention.
Figure 7:
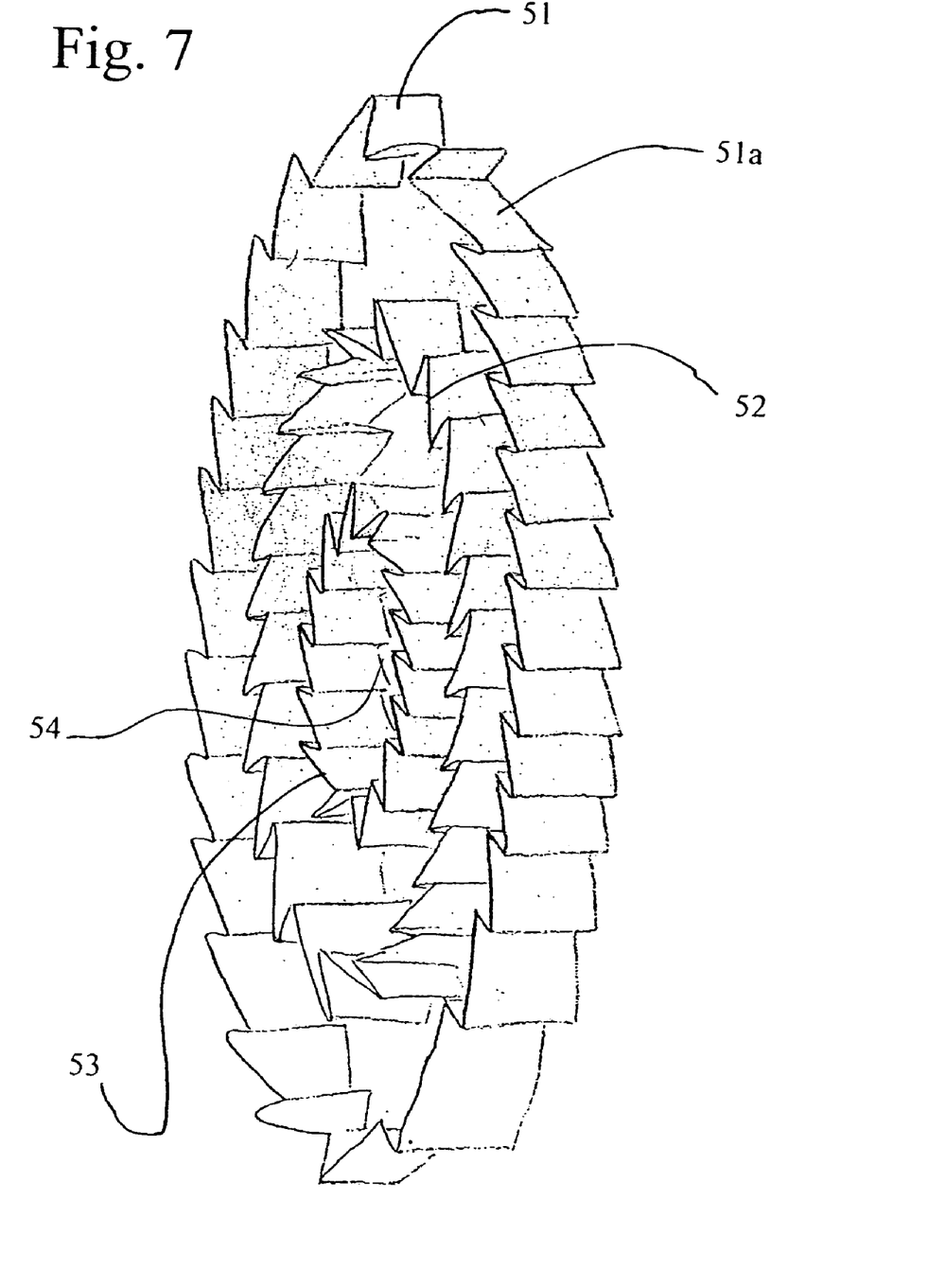
FIG. 7 is a perspective view of FIG. 5.

It will be appreciated that the previous description has been described with regard to a substantially cylindrical rotating component in the form of a shaft held within an essentially concentric cavity in a housing. However, it is also possible to provide a seal in accordance with the present invention in the form of a face seal or an angle cone seal. FIG. 5 and FIG. 7 illustrates in schematic plan view a seal combination in accordance with the present invention used as a face seal. Thus, respective seal surfaces 51, 52, 53 are arranged in a concentric relationship above a rotating plate or cone 54 with the surfaces formed with angled leaves such as at 51a which lie against an adjacent member to effect a seal. The number of seals 51, 52, 53 is determined by the necessary sealing effect created by the pressure differential in the space between the seal elements 51, 52, 53. Operation of each seal element 51, 52, 53 is as described previously with perforations to provide air leakage into the space between these elements 51, 52, 53 and slots provided for surface compliance. A cone (not shown) would extend upwards from the plane of the page with the respective seal components 51, 52, 53 acting upon the surface portions of that cone.

Figure 6:
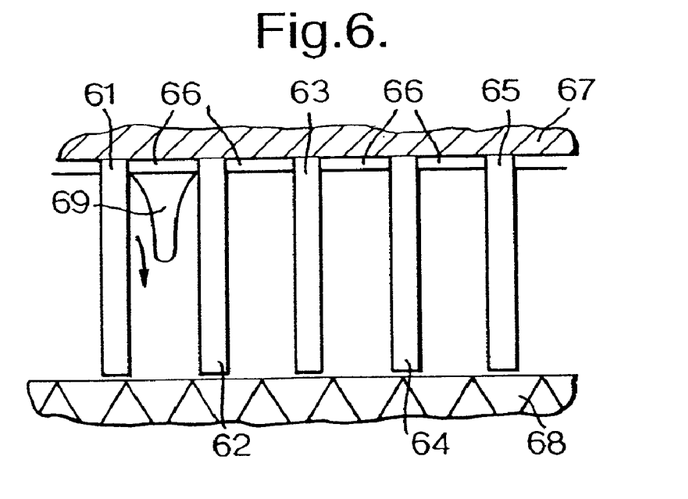
FIG. 6 is a schematic cross-section of a seal assembly.

FIG. 6 illustrates in schematic cross-section a seal assembly in accordance with the present invention. Respective seal elements or surfaces 61, 62, 63, 64, 65 are arranged in a cascade relationship such that the space between these seal surfaces 61, 62, 63, 64, 65 is pressurised by air leakage through the elements 61, 62, 63, 64. The seal elements or surfaces 61, 62, 63, 64 are located such that spacer elements 66 ensure appropriate positioning of the seal elements as required. The elements 61, 62, 63, 64, 65 are secured to a housing 67 whilst the seal edge of each surface or element 61, 62, 63, 64, 65 is held in close proximity but with a gap relative to a rotating component 68.

Leaked air flow enters the space between the element 61, 62, 63, 64 such that a seal is created by pressurisation about the gap between the seal elements edge seal and the rotating component 68.

Further in accordance with the present invention, a flow deflector 69 can be provided in order to direct air leakage through the seal surface or elements 61 downwards in the direction of the arrowhead. Such airflow direction may achieve further improved sealing and air-riding characteristics between the rotating component 68 and the sealing elements or surfaces.

Although depicted with the seal assembly and seal elements or surfaces secured to the static housing it will be appreciated by those skilled in the art that the present seal assembly or seal elements/surfaces could be secured to the rotating component and thus in motion relative to the static housing.

The present invention has been described with regard to air, however where appropriate alternative fluids such as liquid coolants could be utilised with regard to the present seal.

As described previously, the seal edge may be coated or otherwise treated for better performance. Thus, a seal edge may be coated with PTFE or a nitride or treated for increased hardness if required.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A seal formed from an elongated material having a first surface on a first side, a second surface on a second side opposite the first side, and an edge disposed between the first and second sides of the elongated material, the seal comprising:
  an inner seal edge constructed and arranged to surround and seal a relatively rotating surface; and
  an outer edge, the inner seal edge being reinforced by first creases and second creases that extend from said inner seal edge to said outer edge, the first creases disposed between first surfaces of the elongated material on opposite sides of the first creases that contact each other by the elongated material being in forward folded positions at the first creases, the second creases disposed between second surfaces of the elongated material on opposite sides of the second creases that contact one another by the elongated material being in backward folded positions at the second creases, angles of the first and second creases with the edge of the elongated material prior to forming the forward and backward folded positions selected so that the edge of the elongated material has a ring shape, the inner seal edge comprising the edge of the elongated material in the ring shape, wherein perforations are provided in the seal adjacent to the inner seal edge which are constructed and arranged to allow air leakage through the seal during use that provides a lifting force on the seal that pushes the inner seal edge away from said rotating surface, and wherein the first creases are at angles between 110 degrees and 120 degrees with the edge of elongated material and the second creases are at angles of between 60 degrees and 70 degrees from the edge of the elongated material.

2. A seal according to claim 1, further comprising slots disposed between the creases that provide flexibility to the seal.

3. A seal according to claim 1, wherein the seal includes a plurality of inner seal edges in a seal assembly and these inner seal edges are presented upon respective spaced seal surface elements disposed between adjacent first creases of the seal.

4. A seal according to claim 1 wherein the perforations are graded outwardly from the inner seal edge.

5. A seal according to claim 4 wherein the perforations near to the inner seal edge are relatively small compared to perforations further displayed from the inner seal edge and wherein the sizes of the perforations vary.

6. A seal according to claim 5 wherein the perforations nearer to the inner seal edge have a greater population density per unit area compared to perforations further spaced from the inner seal edge.

7. A seal according to claim 1 wherein the perforations are constricted from a first side of the seal to a second side of the seal.

8. A seal according to claim 1 wherein the creases are angular relative to the inner seal edge.

9. A seal according to claim 3 wherein creases in the respective spaced seal surface elements are in a respectively opposed relationship relative to each other.

10. A seal according to claim 2 wherein the slots extend in a generally perpendicular direction from the inner seal edge.

11. A seal according to claim 2 wherein the slots terminate in one of a keyhole and a bulbous end to inhibit crack propagation due to flexing of the inner seal edge.

12. A seal according to claim 2 wherein the slots are of varying lengths extending from the inner seal edge.

13. A seal according to claim 2 wherein the slots have a length at least equivalent to an expected wear depth in use of the seal.

14. A seal according to claim 1 wherein the inner seal edge is substantially straight between the first creases.

15. A seal according to claim 1 wherein the inner seal edge is curved between the first creases.

16. A seal according to claim 1 wherein one of a stiffener fold and a stiffener element is secured to the seal to further reinforce each inner seal edge.

17. A seal according to claim 1 wherein a flow deflector is provided to direct air through the seal.

18. A seal according to claim 1 wherein the inner seal edge is formed upon a spiral which extends for a number of cycles to form the seal.

19. A seal according to claim 1 wherein a number of seals are secured in alignment with the respective inner seal edges presented towards the relatively rotating surface.

20. A seal according to claim 19 wherein spacing elements are located between adjacent seals.

21. A seal according to claim 19 wherein the seals are secured in a recess or aperture.

22. A seal according to claim 1, wherein the first creases having a substantiallyi-clockwise radiating angular presentation from the inner seal edge.

23. A seal according to claim 1, wherein the first and second creases are alternating.

24. A seal according to claim 1, wherein the forward folded positions are substantially opposing the backward folded positions.

25. A seal according to claim 1, wherein the seal is formed from a single continuous elongated material, and ends of the elongated material are fastened.

26. A seal assembly according to claim 1, wherein the number of first and second creases is selected to provide a desired stiffness of the seal and the perforations are constructed and arranged to provide a desired amount of lift to the inner seal edge during use so that the lift and stiffness are balanced to provide a desired gap between the inner seal edge and the rotating surface during use.

27. A gas turbine engine containing at least one seal according to claim 1.

28. A seal according to claim 1, wherein the elongated material is a strip of metal foil.

29. A seal according to claim 22, further comprising a second seal adjacent the seal in which the first creases having a substantially clockwise radiating angular presentation from the inner seal edge, the second seal having a first creases having a substantially anti-clockwise radiating angular presentation from the inner seal edge.

30. A seal formed from an elongated material having a first surface on a first side, a second surface on a second side opposite the first side, and an edge disposed between the first and second sides of the elongated material, the seal comprising:
  an inner seal edge constructed and arranged to surround and seal a relatively rotating surface; and
  an outer edge, the inner seal edge being reinforced by first creases and second creases that extend from said inner seal edge to said outer edge, the first creases disposed between first surfaces of the elongated material on opposite sides of the first creases that contact each other by the elongated material being in forward folded positions at the first creases, the second creases disposed between second surfaces of the elongated material on opposite sides of the second creases that contact one another by the elongated material being in backward folded positions at the second creases, angles of the first and second creases with the edge of the elongated material prior to forming the forward and backward folded positions selected so that the edge of the elongated material has a ring shape, at least one circumferential reinforcement rib or fold extending between adjacent first and second creases, the inner seal edge comprising the edge of the elongated material in the ring shape, wherein perforations are provided in the seal adjacent to the inner seal edge which are constructed and arranged to allow air leakage through the seal during use that provides a lifting force on the seal that pushes the inner seal edge away from said rotating surface.

31. A seal according to claim 30, further comprising slots disposed between the creases that provide flexibility to the seal.

32. A seal according to claim 30, wherein the perforations are graded outwardly from the inner seal edge.

33. A seal according to claim 32 wherein the perforations near to the inner seal edge are relatively small compared to perforations further displayed from the inner seal edge and wherein the sizes of the perforations vary.

34. A seal according to claim 33 wherein the perforations nearer to the inner seal edge have a greater population density per unit area compared to perforations further spaced from the inner seal edge.

35. A seal according to claim 31, wherein the slots extend in a generally perpendicular direction from the inner seal edge.

36. A seal according to claim 31, wherein the slots terminate in one of a keyhole and a bulbous end to inhibit crack propagation due to flexing of the inner seal edge.

37. A seal according to claim 31, wherein the slots have a length at least equivalent to an expected wear depth in use of the seal.

38. A seal according to claim 30, wherein a number of seals are secured in alignment with the respective inner seal edges presented towards the relatively rotating surface.

39. A seal according to claim 30, wherein the seal is formed from a single continuous elongated material, and ends of the elongated material are fastened.

40. A seal according to claim 30, wherein the elongated material is a strip of metal foil.

41. A seal according to claim 30, further comprising a second seal adjacent the seal in which the first creases having a substantially clockwise radiating angular presentation from the inner seal edge, the second seal having a first creases having a substantially anti-clockwise radiating angular presentation from the inner seal edge.

* * * * *